US005725708A

United States Patent [19]

Earle et al.

[11] Patent Number: 5,725,708

[45] Date of Patent: Mar. 10, 1998

[54] REMOVAL OF TAPED SPLICES

[75] Inventors: Anthony Earle, Harrow Weald; Edward Charles Timothy Samuel Glover, London, both of England

[73] Assignee: Eastman Kodak Company, Rochester, N.Y.

[21] Appl. No.: 677,055

[22] Filed: Jul. 9, 1996

[30] Foreign Application Priority Data

Jul. 29, 1995 [GB] United Kingdom .................... 9515630

[51] Int. Cl.$^6$ .............................. B31F 5/06; B32B 35/00

[52] U.S. Cl. ........................ 156/157; 156/256; 156/304.3; 156/344; 156/584; 29/426.5

[58] Field of Search ................................ 156/157, 304.3, 156/344, 584, 256; 29/426.1, 426.5

[56] References Cited

U.S. PATENT DOCUMENTS

| | | | |
|---|---|---|---|
| 4,210,688 | 7/1980 | Sato | 156/256 X |
| 4,335,172 | 6/1982 | Sato | 156/256 X |
| 4,375,490 | 3/1983 | Jensen et al. | 156/304.6 X |
| 5,373,339 | 12/1994 | Greene et al. | 354/354 |
| 5,608,487 | 3/1997 | Pierce et al. | 156/584 X |

FOREIGN PATENT DOCUMENTS

| | | | |
|---|---|---|---|
| 2 202 879 | 7/1973 | Germany | G03D 15/04 |

*Primary Examiner*—Mark A. Osele
*Attorney, Agent, or Firm*—Charles E. Snee, III

[57] ABSTRACT

Described herein is a method of removing splicing tape (30) from two filmstrips (10, 20). Trailing edge (12) of filmstrip (10) has an aperture (14) formed therein over which at least a portion (32) of splicing tape (30) overlaps. At a splice removal station (40) comprising a pair of spaced apart support surfaces (42, 44) which defined a gap (46) therebetween, a gripper device (48) passes through aperture (14) to grip portion (32) of the splicing tape (30) and to detach it from trailing edge (12) of filmstrip (10). As gripper device (48) is pulled downwards through gap (46), splicing tape (30) is drawn over edge (50) on support surface (42) to detach it from leading edge (22) of filmstrip (20).

4 Claims, 2 Drawing Sheets

REMOVAL OF TAPED SPLICES

FIELD OF THE INVENTION

The present invention relates to the removal of taped splices, particularly from photographic filmstrips.

1. Background of the Invention

It is well known to splice exposed filmstrips together to form a roll for processing, that is, for developing and printing. Traditionally, a leading end of one filmstrip is attached to a trailing end of another filmstrip using splicing tape, the addition of the splicing tape increasing the overall thickness of the roll at each splice. Once processing has been completed, the splicing tape is removed so that the roll can be separated into its component filmstrips for returning to customers.

2. Problem to be solved by the Invention

In some cases, it maybe difficult to remove the splicing tape from both the trailing and leading edges of the filmstrip during separation from the roll.

SUMMARY OF THE INVENTION

It is an object of the present invention to provide a system which enables the splicing tape to be removed from both the trailing and leading edges of the filmstrips.

In accordance with one aspect of the present invention, there is provided a method of joining two filmstrips using splicing tape and subsequently removing the splicing tape therefrom, the method being characterised by the steps of:

a) forming an aperture in a trailing edge of a first filmstrip;

b) joining the trailing edge of the first filmstrip to a leading edge of a second filmstrip using splicing tape, a portion of the splicing tape overlapping a portion of the aperture formed in the trailing edge of the first filmstrip;

c) gripping the portion of the splicing tape overlapping the aperture;

d) pulling the splicing tape out of contact with the trailing edge of the first filmstrip; and e) drawing the remainder of the splicing tape over a surface to separate it from the leading edge of the second filmstrip.

Preferably, the filmstrips are supported by at least one support surface, the surface effecting separation of the splicing tape from the leading edge of the second filmstrip comprising a sharp edge formed in at least one support surface.

Advantageously, two support surfaces are provided with a gap therebetween, the sharp edge being formed on one side of the gap. The portion of the splicing tape overlapping the aperture is gripped through the gap.

Advantageous Effect of the Invention

By this arrangement, one simple action is required to remove all the splicing tape from the filmstrips while they are moving in the same forward direction.

BRIEF DESCRIPTION OF THE DRAWINGS

For a better understanding of the present invention, reference will now be made, by way of example only, to the accompanying drawings in which.

DETAILED DESCRIPTION OF THE INVENTION

Figure 1:
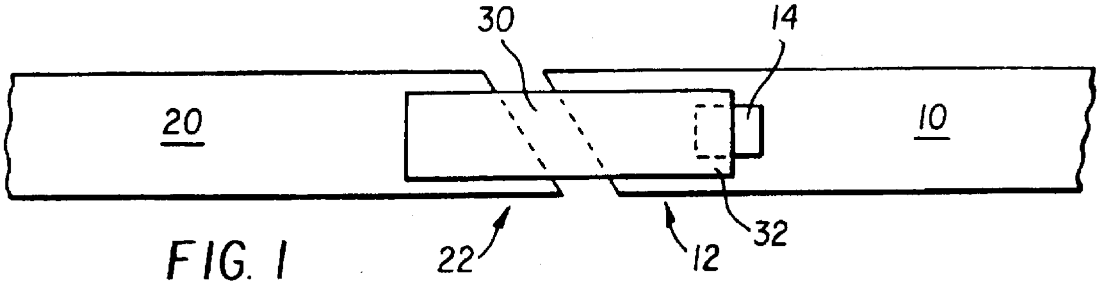
FIG. 1 is a schematic plan view illustrating two filmstrips which have been joined together with splicing tape in accordance with the present invention.

In FIG. 1, two filmstrips 10, 20 are shown, and in particular, trailing edge 12 of filmstrip 10 and leading edge 22 of filmstrip 20. The trailing edge 12 of filmstrip 10 is joined to the leading edge 22 of filmstrip 20 by splicing tape 30. As shown, trailing edge 12 of filmstrip 10 has an aperture 14 formed therein. Splicing tape 30 is positioned so that an end 32 thereof overlaps a portion of aperture 14 as shown, the portion being overlapped is shown in dotted lines.

Figure 2:
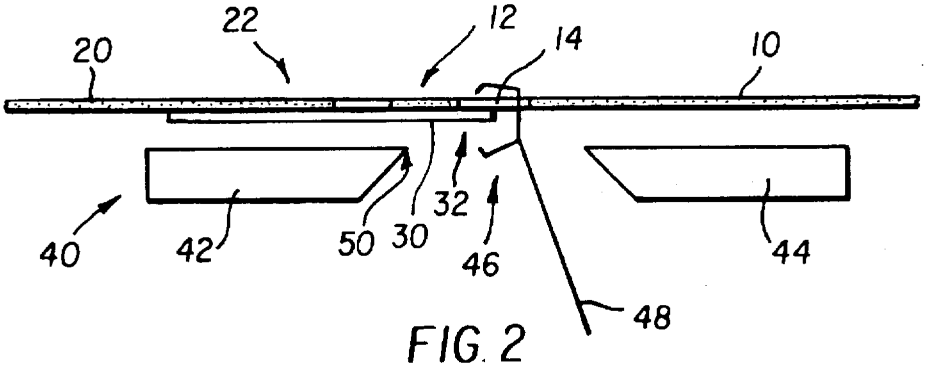
FIG. 2 is a schematic side elevation of a splice removal station.

FIG. 2 illustrates a splice removal station 40 in which splicing tape 30 is to be removed from filmstrips 10, 20. The station 40 comprises support surface portions 42, 44 which are separated by a gap 46. A gripper device 48 is positioned in the gap 46 for operation which will be described later. As shown, the two filmstrips 10, 20 which are joined by splicing tape 30 are positioned on support surface portions 42, 44 with splicing tape 30 adjacent these surfaces.

Figure 3:
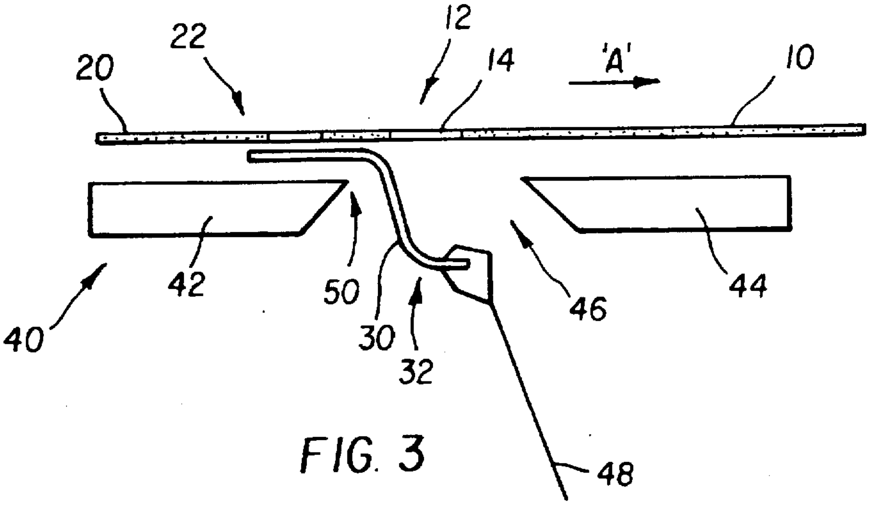
FIG. 3 is similar to FIG. 2 but illustrates the operation of a gripper device in the splice removal station.

When splicing tape 30 is to be removed from filmstrips 10, 20, gripper device 48 extends through gap 46 in support surface portions 42, 44 and into aperture 14 formed in trailing end 12 of filmstrip 10 to grip end 32 of splicing tape 30 and to pull it downwards through gap 46. During this, the splicing tape 30 is peeled off the trailing end 12 of filmstrip 10, as shown in FIG. 3, and, as the filmstrips 10, 20 are driven in the direction indicated by arrow 'A', the splicing tape 30 is drawn over sharp edge 50 of support surface 42 and is pulled off leading edge 22 of filmstrip 20. Filmstrip 20 continues to be driven in the direction indicated by arrow 'A' until its trailing edge (not shown) reaches the splice removal station 40 and the operation is repeated.

Figure 4:
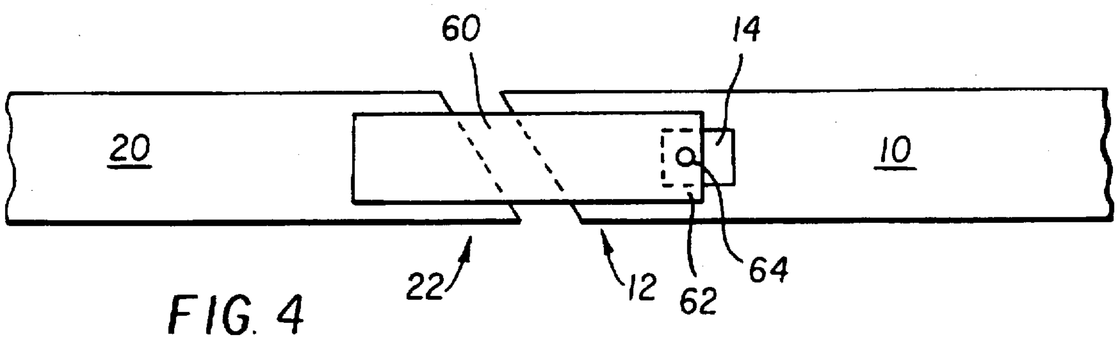
FIG. 4 is similar to FIG. 1 but showing a different splicing tape.
Figure 5A:
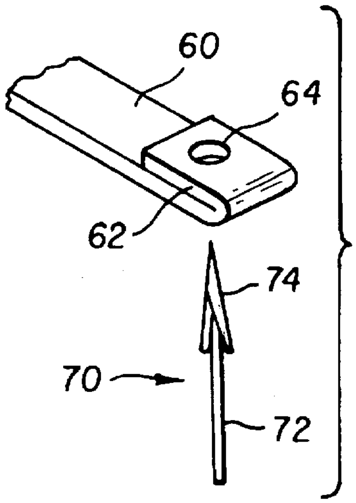
FIGS. 5(*a*)–5(*d*) are similar to FIG. 2 but illustrate the operation of an alternative gripper device.
Figure 5B:
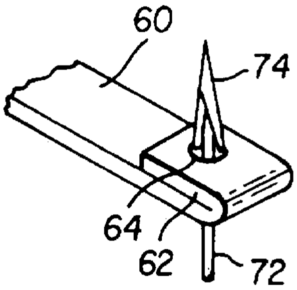
Figure 5C:
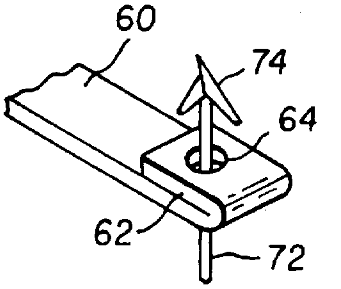
Figure 5D:
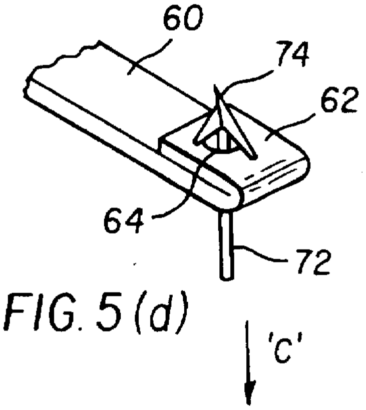

In FIG. 4, filmstrips 10, 20 are shown with their respective trailing edges 12 and leading edges 22 joined together by splicing tape 60. Splicing tape 60 differs from splicing tape 30 in that it has a reinforced area 62 in which a hole 64 is formed, the reinforced area 62 and hole 64 being shown more clearly in FIG. 6. Reinforced area 62 is formed by folding over one end of the splicing tape 60, and overlaps aperture 14 as described above.

FIG. 5 illustrates the steps of operation of another gripper device 70. As shown in FIG. 5(*a*), the device 70 comprises a shaft portion 72 and a head portion 74. At a splice removal station similar to that shown in FIG. 2, device 70 replaces device 48 in removing splicing tape 50. Head portion 74 is pushed through hole 64 of reinforced area 62 (FIG. 5(*b*) and then extended, as shown in FIG. 5(*c*). Once extended, the device 70 is moved downwards, in the direction indicated by arrow 'C' in FIG. 5(*d*), so that the extended head portion 74 engages reinforced area 62 and pulls splicing tape 60 off trailing edge 12, over sharp edge 50 (not shown), and off leading edge 22.

Head portion 74 can be sprung outwardly so that the desired engagement occurs between the head portion 74 and reinforced area 62 as the device 70 is pulled downwards in the direction of arrow 'C'. Alternatively, the head portion 74 can be weighted to effect the desired engagement between the device 70 and the reinforced area 62.

The invention has been described with reference to a preferred embodiment. However, it will be appreciated that variations and modifications can be effected by a person of ordinary skill in the art without departing from the scope of the invention.

What is claimed is:

1. A method of joining two filmstrips using splicing tape and subsequently removing the splicing tape therefrom, the method being characterised by the steps of:

a) forming an aperture in a trailing edge of a first filmstrip;

b) joining the trailing edge of the first filmstrip to a leading edge of a second filmstrip using splicing tape, a portion of the splicing tape overlapping a portion of the aperture formed in the trailing edge of the first filmstrip;

c) gripping the portion of the splicing tape overlapping the aperture;

d) pulling the splicing tape out of contact with the trailing edge of the first filmstrip; and e) drawing the remainder of the splicing tape over a surface to separate it from the leading edge of the second filmstrip.

2. A method according to claim 1, wherein the filmstrips are supported by at least one support surface, the surface which effects separation of the splicing tape from the leading edge of the second filmstrip comprising a sharp edge formed in at least one support surface.

3. A method according to claim 2, wherein two support surfaces are provided with a gap therebetween, the sharp edge being formed on one side of the gap.

4. A method according to claim 3, wherein the portion of the splicing tape overlapping the aperture is gripped through the gap.

* * * * *